(12) United States Patent
Na

(10) Patent No.: US 6,792,099 B1
(45) Date of Patent: Sep. 14, 2004

(54) TRAFFIC CONTROL METHOD FOR INTELLIGENT NETWORK SERVICES

(75) Inventor: Jung Sun Na, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/736,136

(22) Filed: Dec. 15, 2000

(30) Foreign Application Priority Data

Dec. 16, 1999 (KR) ........................................ 1999-58312

(51) Int. Cl.[7] .......................... H04M 7/00; H04M 15/00
(52) U.S. Cl. .............. 379/221.09; 379/133; 379/221.01
(58) Field of Search ........................ 379/220.01–221.14

(56) References Cited

U.S. PATENT DOCUMENTS

| | | | | |
|---|---|---|---|---|
| 5,566,235 A | * | 10/1996 | Hetz | 379/221.02 |
| 5,825,860 A | * | 10/1998 | Moharram | 379/112.01 |
| 5,878,129 A | * | 3/1999 | Figurski et al. | 370/229 |
| 5,963,630 A | * | 10/1999 | Dabbs et al. | 379/201.01 |
| 6,535,736 B1 | * | 3/2003 | Balogh et al. | 455/434 |

* cited by examiner

Primary Examiner—Ahmad F. Matar
Assistant Examiner—Hector Agdeppa
(74) Attorney, Agent, or Firm—Fleshner & Kim, LLP

(57) ABSTRACT

A traffic control method for intelligent network services is disclosed. When an overload state is detected, a service control point (SCP) requests a call gapping operation by transmitting a call gapping message containing a gapping information to a service switching point (SSP), the SSP executing the call gapping operation for controlling an intelligent network call to arrive only at the SCP that has requested the call gapping message by distinguishing between different physical nodes of each SCP.

13 Claims, 4 Drawing Sheets

1

TRAFFIC CONTROL METHOD FOR INTELLIGENT NETWORK SERVICES

BACKGROUND OF THE INVENTION

1. Field of the Invention

The present invention relates to a intelligent network system, and more particularly, to a traffic control method for intelligent network services which is capable of effectively controlling a traffic between a SSP(Service Switching Point) and a SCP(Service Control Point).

2. Description of the Background Art

FIG. 1 is a schematic view of a conventional intelligent network(IN) system.

As illustrated in FIG. 1, the IN system includes a service switching point(SSP) 10 and a plurality of service control points(SCP) 11-1 through 11-n.

The SSP 10 is a network element for detecting and executing an IN service. The SSP 10 generates a query required for service execution to the SCP 11-1 through 11-n by detecting the IN service, and executes the IN service according to the service control command of the corresponding SCP. In addition, the SSP 10 also executes a basic call processing function conductbd by a normal, such as the detection of the state of origination and destination sides:

The SSP 10 is connected to the SCP 11-1 through 11-n via a SS7 link 50 while being connected to a subscriber terminal 40 via a telephone line 30. Also, the SSP 10 is connected to another plurality of SSP(not shown) via a trunk(not shown) for transmitting communication signals, e.g., sound and/or data.

The SCP 11-1 through 11-n each are physical network elements for controlling an IN service. The SCP serves to generate a service control command to the SSP 10 by executing a service logic stored in a database upon receipt of an IN service request from the SSP 10.

The call gapping operation in the thusly constructed conventional IN system will be explained with reference to the accompanying drawings.

In the intelligent network(IN) system, calls are generally divided into intelligent network(IN) calls requiring a service request query from the SSP 10 to the SCP 12 and normal calls which are processed by the SSP 10 alone.

When a call is initiated from a service subscriber, the SSP 10 performs an appropriate call processing by detecting whether a subscriber call is an IN call or a normal call. That is, when a call is initiated from a service subscriber, the software of the SSP 10 detects an IN call and a normal call by referring to trigger data, and thereafter generates a query required for service execution to a specific SCP, e.g., the SCP 11-1 with respect to the IN call.

In other words, the SSP generates triggers in response to the activity in the subscriber station, for example, when the subscriber's telephone is hooked off, the SSP 10 generates appropriate subscriber-related triggers. At this time, the nature and format of the triggers are standardized to the SS7(Signaling System7) protocol as already known.

The SSP 10 discriminates IN calls from normal calls by comparing the generated triggers with trigger criteria, and then generates a query required for the execution of the corresponding IN service by using the INAP(lntelligent Network Application Protocol). Thus, the SCP 11-1 performs a predetermined service logic according to the service query from the SSP 10, and then generates a service control command to the SSP 10, whereby the SSP 10 performs the processing of the corresponding IN service according to the service control command.

On the contrary, if the service subscriber's call is a normal call, the SSP 10 processes the call according to a basic call processing procedure.

As described above, generally, the IN service generated by a local switch or a transit switch is processed by the SSP according to the control of the SCP. That is, the SSP generates a query required for the execution of the IN service to the SCP, and thereafter processes the IN service according to the service control command of the SCP, However, if an excessive request for IN services is generated from the SSP to the SCP, an overload is generated on a signal link between the SSP and the SCP to thus generate a large amount of incomplete calls. In addition, also in the case that an overload is generated on the SCP due to an IN service request from an intelligent network switch, a large amount of incomplete calls are generated, is though there are sufficient signal links between the intelligent network switch and the SCP. Thus, a normal service control function is disabled, and even a service failure is occurred.

Therefore, when the above overload state is generated, the corresponding SCP 11-1 automatically performs a call gapping operation in order to the frequency of an accessed service request, or performs a manual call gapping operation for manually controlling overload according to a service operator's request. That is, as illustrated in FIG. 1, when an overload is generated by a large amount of service A requests, the corresponding SCP 11-1 transmits a call gapping message(CGM) to the SSP 10 in order to control the overload state.

Consequently, the SSP 10 applies the call gapping operation according to the call gapping message(CGM). At this time, as illustrated in FIG. 1, the SSP 10 applies the call gapping operation for service A, not only to the SCP 11-1 by distinguishing between different physical nodes, but to all SCPs 11-1 through 11-n regardless of the different physical nodes of the SCP 11-1 through 11-n in the same manner.

In this way, in the conventional traffic control method for intelligent network services, the call gapping operation is applied by recognizing the group of SCPs as a single SCP irrespective of the physical nodes of the SCPs. As the result, in the case that the IN network is divided into a plurality of SCP groups later, the traffic control method for intelligent network services is disadvantageous in that it is impossible to control a call arrival at a specific node(SCP).

SUMMARY OF THE INVENTION

Accordingly, it is an object of the present invention to provide a traffic control method for intelligent network services which is capable of exclusively performing a call gapping operation by distinguishing between different physical nodes of each SCP.

It is another object of the present invention to provide a traffic control method for intelligent network services which is capable of controlling a call arrival by each intelligent network group when an intelligent network is divided into a plurality of groups.

To achieve the above objects, there is provided a traffic control method for intelligent network services according to the present invention, in an intelligent network(IN) constructed of a plurality of SCPs and more than one SSP group, which includes the steps of: directing a SSP to perform a call gapping operation by distinguishing between different physical nodes upon detecting an overload; and applying the call gapping operation only to the corresponding SCP by distinguishing between the different physical nodes of the SCP that has requested the call gapping operation based on a call gapping message transmitted from the SCP upon receiving an IN service request from a subscriber.

To achieve the above objects, the step of applying the call gapping operation includes the steps of: receiving an IN call from a subscriber; searching the SCP that has requested the call gapping operation by distinguishing between the different physical nodes of the SCP group upon receipt of the IN call; checking if the searched SCP has requested the call gapping operation or not; and, if the searched SCP has requested the call gapping operation, performing the call gapping operation by checking if the corresponding IN call satisfies the corresponding call gapping condition.

In addition, to achieve the above objects, there is provided a traffic control method for intelligent network services according to the present invention, in an intelligent network (IN) constructed of a plurality of SCPs and more than one SSP group, which includes the steps of: transmitting a call gapping message to a SSP by distinguishing between physical nodes upon detecting an overload: searching the SCP that has requested a call gapping operation by distinguishing the different physical nodes of the SCP group upon receipt of an IN call from a subscriber; checking if the searched SCP has requested the call gapping operation or not; if the searched SCP has requested the call gapping operation, checking if the corresponding IN call satisfies the corresponding call gapping operation or not; and, if the corresponding IN call satisfies the call gapping operation, performing the call gapping operation.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiment of the present invention will now be described with reference to the accompanying drawings.

Figure 1:
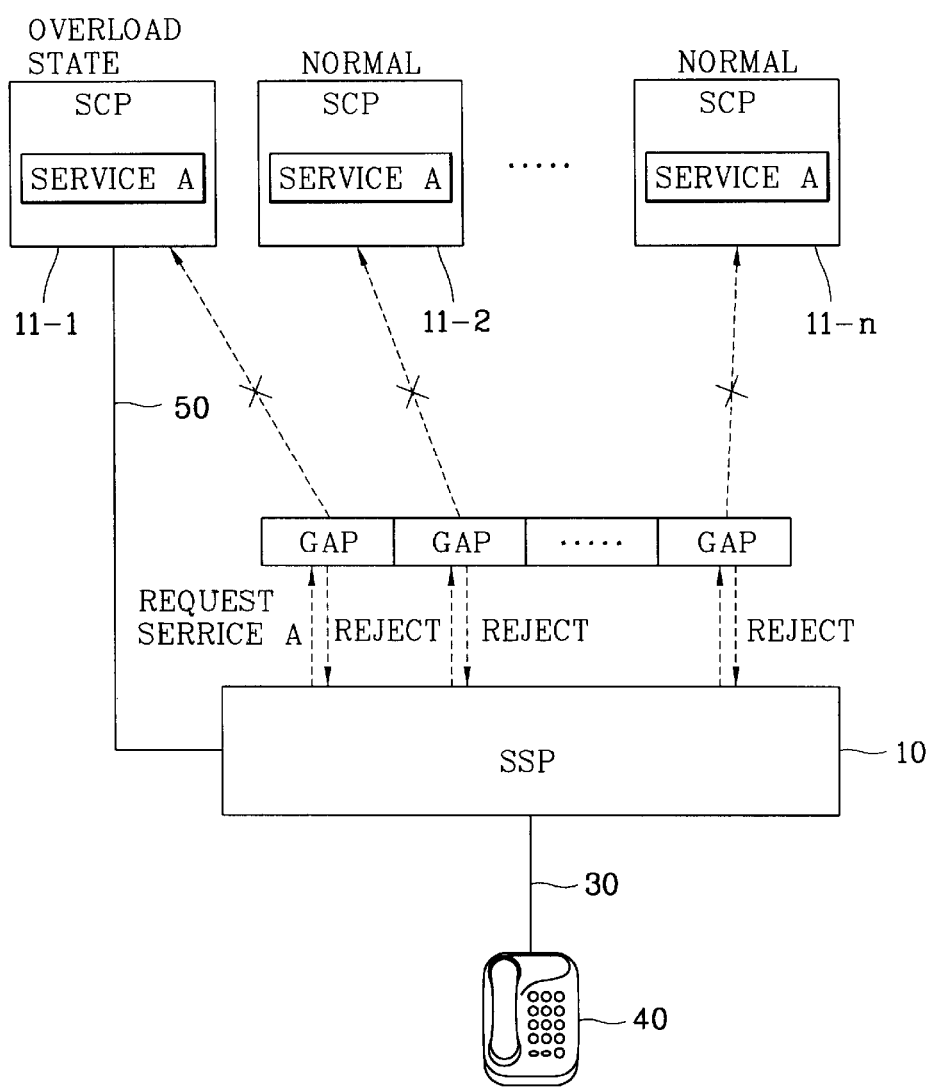
FIG. 1 is a schematic view of a conventional intelligent network(IN) system.

The traffic control method for intelligent network services according to the present invention employs a conventional intelligent(IN) system as illustrated in FIG. 1.

In the traffic control method for intelligent network services according to the present invention, in case of performing a call gapping operation, the call gapping operation is applied only to the SCP that has directed the corresponding call gapping operation by distinguishing between the different physical nodes of the SCP.

That is, the SCP that is detected to be in the overload state requests the call gapping operation by transmitting a call gapping message to the SSP containing a gapping information in order to reduce the frequency of a service request. The SSP control a call arrival by applying the call gapping operation only to the SCP that has requested the call gapping message by distinguishing between the different physical nodes of each SCP.

Hereinafter, the traffic control method for intelligent network services according to the present invention will now be described in detail with reference to the accompanying drawings.

First, the cases of generating an overload in the SCP are as follows.

(1) an excessive call is generated from SSPs to the same telephone number at the same time.

(2) a large amount of calls are generated from SSPs to a specific IN service at the same time.

(3) an excessive call is generated from a specific SSP.

Suppose that such an overload state is detected by a SCP 21-1 in S1, the SCP 21-1 distinguishes between different physical nodes, and thereafter transmits a call gapping message containing a gap parameter(INAP parameter) to a SSP 20 via a link 50 using the Signaling System No. 7(SS7) Transaction Capability Application Part(TCAP) in S2. At this time, the INAP(Intelligent Network Application Protocol) is disposed at the top of the TCAP in order to establish a control dialogue between the SSP 20 and the SCP 21-1.

At this time, the gap parameter includes: Gap Criteria for identifying a call gapping condition; a Gap Indicator defining the duration and interval of a call gapping, a Control Type for indicating the reason why the call gapping is activated; and a Gap Treatment for specifying what to do with calls rejected by the call gapping. And, the Gap Criteria are one of a destination number digit, service key, destination number digit and service key, and origination number digit and service key. The Control Type specifies whether the call gapping operation is an automatic call gapping operation by means of the SCP, a manual call gapping operation by a service operator, or a manual call gapping operation by a network/service management center for normal calls.

Consequently, whenever the SSP 20 receives an IN service request from a service user, it controls a call arrival by applying the call gapping operation only to the SCP that has requested a call gapping message by distinguishing between different physical nodes of each SCP in S3.

Figure 4:
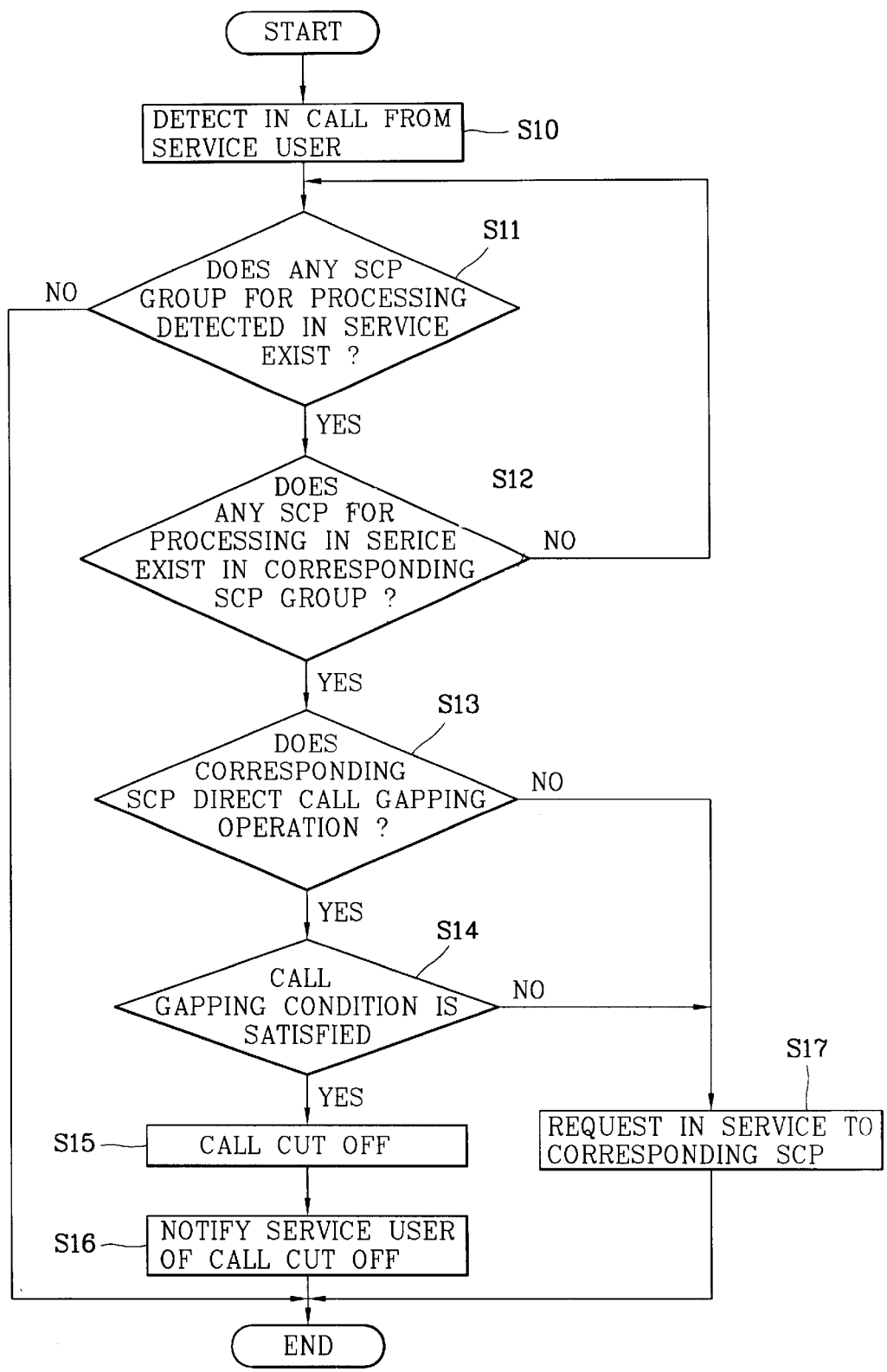
FIG. 4 is a flow chart illustrating the step of performing a call gapping operation carried out on a SSP.

Hereinafter, the implementation of the call gapping operation of the SSP 20 will now be described in detail with reference to FIG. 4.

When the SSP 20 receives an IN service(service A) request from an IN service subscriber, it checks if there exists any SCP group requesting the corresponding IN service, and, if so, checks if there exists any SCP for processing the IN service requested from the subscriber in the corresponding SCP group in S12.

As the result of the checking, if the SCP 21-1 in the SCP group processes the IN service requested from the subscriber, the SSP 20 checks if the SCP 21-1 has requested a call gapping operation in S13. If the corresponding SCP 21-1 has requested the call gapping operation, the SSP 20 judges whether to apply the call gapping operation or not by checking a detection point triggered by an IN call. In other words, the SSP 20 checks if the corresponding IN call satisfies a call gapping condition by comparing the Gap Criteria with the service key or destination number digit value of the currently triggered detection point in S14.

Figure 2:
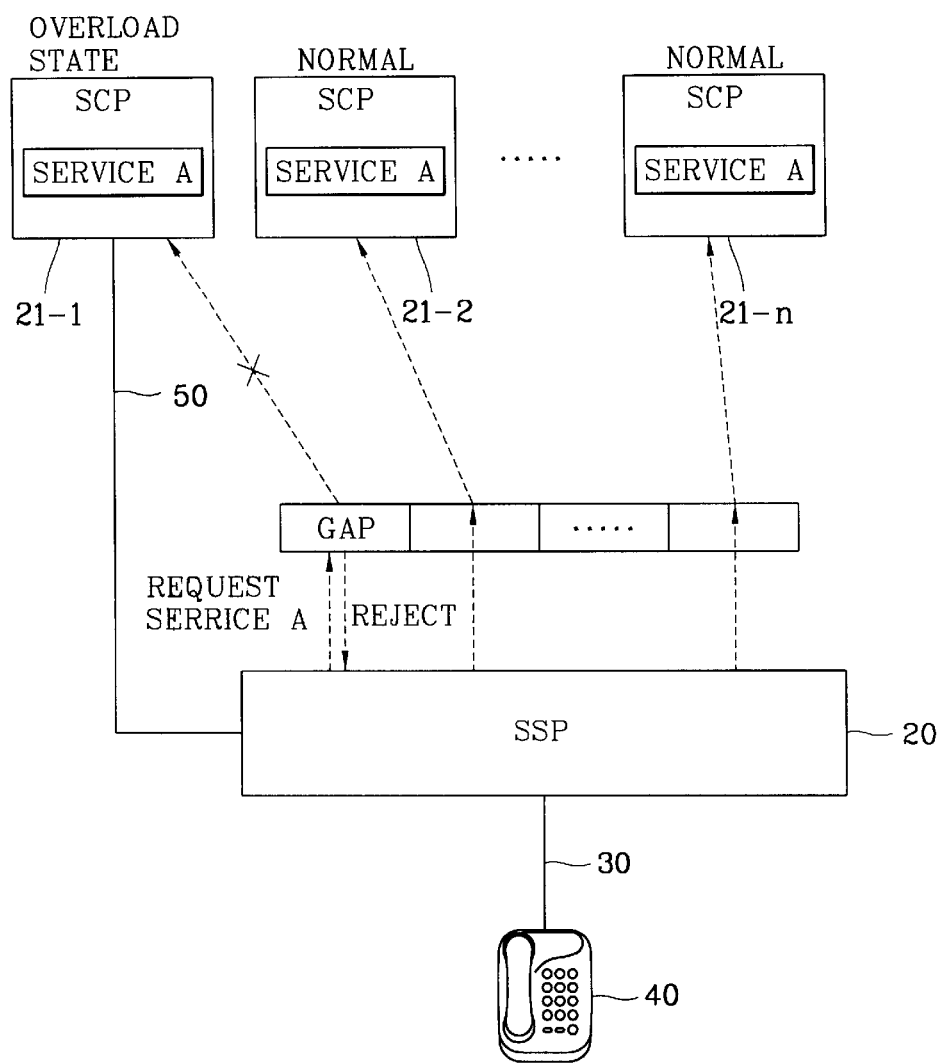
FIG. 2 is a schematic view of an IN system according to the present invention.
Figure 3:
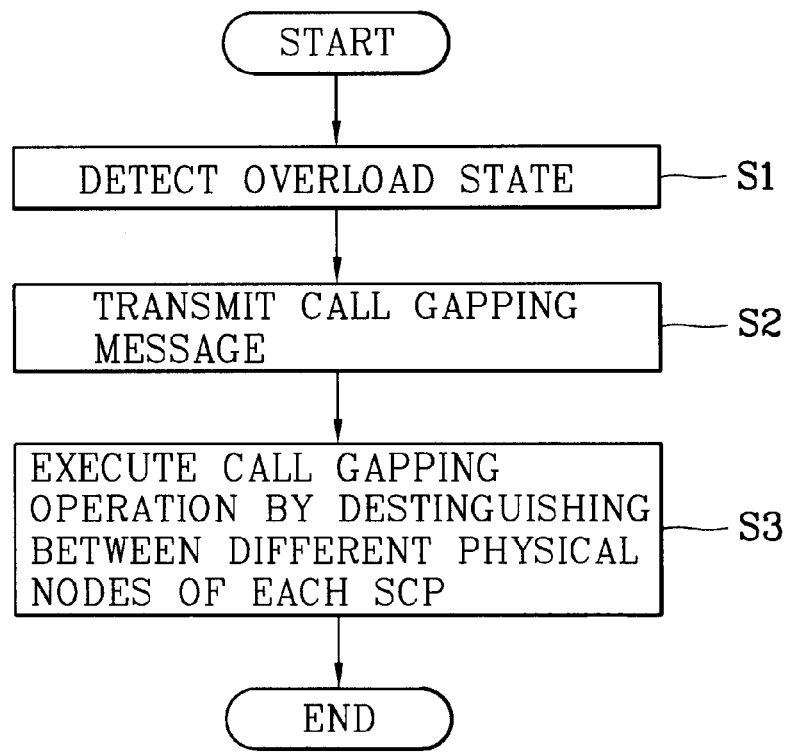
FIG. 3 is a flow chart illustrating a traffic control method for intelligent network services according to the present invention which is executed between a SSP and a SCP.

If the corresponding IN call satisfies the call gapping condition, as illustrated in FIG. 2, the SSP 20 performs the call gapping operation for the duration or interval defined by the Gap Indicator of the INAP parameter in S15, and normally requests the IN service to the SCP 21-2 through 21-n. At this time, the call gapping operation is achieved only when the call gapping is in the active state, said active-state is determined by the duration of the call gapping applied to the Gap Indicator. The reason why the call gapping is activated, that is, whether the call gapping is an automatic gapping by the SCP or a manual gapping by the operator, is specified in the Control Type.

In addition, in executing the call gapping operation, the SSP 20 notifies the IN service subscriber that the corresponding call is currently filtered out by announcement or tone with reference to the Gap Treatment of the INAP parameter in S16. And, the number of IN calls filtered out during the execution of the call gapping operation is recorded in a call filtering register.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

As described above, in the traffic control method for intelligent network services according to the present invention, it is possible to control a call arrival by SCP groups by applying the call gapping operation only to the SCP that has requested the call gapping operation by distinguishing the different physical nodes of each SCP.

What is claimed is:

1. In an intelligent network (IN) constructed of a plurality of service control points (SCPs) and more than one service switching point (SSP) group, a traffic control method for intelligent network services, comprising:

directing a SSP to perform a call gapping operation by distinguishing between different SCPs of an SCP group upon detecting an overload;

applying the call gapping operation to a SCP that has requested the call gapping operation based on a call gapping message without modifying a distribution plan of the SCP group, wherein applying the call gapping operation further comprises receiving an IN call from a subscriber;

identifying the SCP that has requested the call gapping operation by distinguishing between the different SCPs of the SCP group upon receipt of the IN call;

checking if the identified SCP has requested the call gapping operation;

determining if the IN call satisfies the call gapping condition, if the identified SCP has requested the call gapping operation; and performing the call gapping operation if the call gapping condition is satisfied.

2. The method according to claim 1, wherein the call gapping message comprises:

a plurality of criteria for identifying a call gapping condition;

an indicator defining the duration and interval of a call gapping;

a controller for indicating the reason why the call gapping is activated; and an instructor for specifying what to do with calls rejected by the call gapping.

3. The method according to claim 2, wherein the plurality of criteria are one of a destination number digit, service key, destination number digit and service key, and origination number digit and service key.

4. The method according to claim 1, wherein identifying the SCP further comprises:

checking if any SCP group requests the IN service; and determining if any SCP is available to process the IN service in the corresponding SCP group, if there is a requesting SCP group.

5. The method according to claim 1, wherein determining if the IN call satisfies the call gapping condition is executed by comparing the plurality of criteria of the gap parameter contained in the call gapping message with the service key or destination number digit value of the detection point triggered by the IN call.

6. The method according to claim 1 further comprises notifying the IN subscriber that a corresponding call is currently filtered out with reference to the call gapping message.

7. The method according to claim 6, wherein the corresponding call is filtered out during the execution of the call gapping operation and is recorded in a call filtering register.

8. The method according to claim 2, wherein the plurality of criteria is defined by Gap Criteria, the indicator is defined by Gap Indicator, the controller is defined by Control Type, and the instructor is defined by Gap Treatment.

9. In an intelligent network constructed of a plurality of service control points (SCPs) and more than one service switching point (SSP) group, a traffic control method for intelligent network services, comprising:

transmitting a call gapping message to an SSP upon detecting an overload;

identifying which SCP has requested a call gapping operation by distinguishing between different SCPs of an SCP group for processing the call gapping operation upon receipt of an IN call;

checking if the identified SCP has requested the call gapping operation;

determining if the IN call satisfies the call gapping operation, if the identified SCP has requested the call gapping operation; and performing the call gapping operation if the IN call satisfies the call gapping operation without modifying a distribution plan of the SCP group.

10. The method according to claim 9, wherein the call gapping message comprises:

a plurality of criteria for identifying a call gapping condition;

an indicator defining the duration and interval of a call gapping;

a controller for indicating the reason why the call gapping is activated; and an instructor for specifying what to do wvith calls rejected by the call gapping.

11. The method according to claims 9, wherein identifying the SCP comprises:

checking if any SCP group requests the IN service; and determining if any SCP is available to process the IN service in the SCP group, if there is a requesting SCP group.

12. The method according to claim 9, wherein determining if the IN call satisfies the call gapping condition is executed by comparing the plurality of criteria of the gap parameter contained in the call gapping message with the service key or destination number digit value of the detection point triggered by the IN call.

13. The method according to claim 12, wherein the plurality of criteria is defined by Gap Criteria, the indicator is defined by Gap Indicator, the controller is defined by Control Type, and the instructor is defined by Gap Treatment.

* * * * *